(12) United States Patent
Yang et al.

(10) Patent No.: US 9,264,210 B2
(45) Date of Patent: Feb. 16, 2016

(54) METHOD FOR USER EQUIPMENT TRANSRECEIVING SIGNAL IN WIRELESS COMMUNICATION SYSTEM

(75) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 93 days.

(21) Appl. No.: 14/119,032

(22) PCT Filed: Jun. 28, 2012

(86) PCT No.: PCT/KR2012/005152
§ 371 (c)(1),
(2), (4) Date: Nov. 20, 2013

(87) PCT Pub. No.: WO2013/002590
PCT Pub. Date: Jan. 3, 2013

(65) Prior Publication Data
US 2014/0177488 A1  Jun. 26, 2014

Related U.S. Application Data

(60) Provisional application No. 61/501,789, filed on Jun. 28, 2011, provisional application No. 61/655,508, filed on Jun. 5, 2012.

(51) Int. Cl.
| | |
|---|---|
| *H04J 3/00* | (2006.01) |
| *H04L 5/14* | (2006.01) |
| *H04B 7/26* | (2006.01) |
| *H04L 5/00* | (2006.01) |
| *H04L 27/26* | (2006.01) |

(52) U.S. Cl.
CPC ............ *H04L 5/1469* (2013.01); *H04B 7/2615* (2013.01); *H04B 7/2643* (2013.01); *H04L 5/0007* (2013.01); *H04L 5/0037* (2013.01); *H04L 5/0064* (2013.01); *H04L 27/2602* (2013.01)

(58) Field of Classification Search
None
See application file for complete search history.

(56) References Cited

U.S. PATENT DOCUMENTS

| | | | |
|---|---|---|---|
| 2010/0246456 | A1 | 9/2010 | Suo et al. |
| 2011/0032855 | A1 | 2/2011 | Kim et al. |
| 2013/0070690 | A1* | 3/2013 | Moon et al. .................. 370/329 |

FOREIGN PATENT DOCUMENTS

| | | |
|---|---|---|
| CN | 101425845 A | 5/2009 |
| KR | 10-2009-0112574 A | 10/2009 |
| KR | 10-2010-0092475 A | 8/2010 |
| KR | 10-2011-0058665 A | 6/2011 |
| WO | 2011/065703 A2 | 6/2011 |
| WO | WO 2011/068995 A2 | 6/2011 |

* cited by examiner

*Primary Examiner* — Afshawn Towfighi
(74) *Attorney, Agent, or Firm* — Birch, Stewart, Kolasch & Birch, LLP

(57) ABSTRACT

The present invention relates to a method for receiving a signal between a user equipment and a base station in a wireless communication system, and to an apparatus for same. More particularly, a method for the user equipment receiving the signal in the wireless communication system, which is operated by a time division duplex (TDD), comprises the steps of: confirming a subframe which is reconfigured as a downlink, from a plurality of subframes that are configured according to a TDD uplink-downlink configuration; and receiving the signal from the subframe, which is reconfigured, wherein an index of the last orthogonal frequency division multiplexing (OFDM) symbol, from which the signal can be received, is decided in the subframe that is reconfigured.

8 Claims, 9 Drawing Sheets

METHOD FOR USER EQUIPMENT TRANSRECEIVING SIGNAL IN WIRELESS COMMUNICATION SYSTEM

CROSS REFERENCE TO RELATED APPLICATIONS

This application is the National Phase of PCT/KR2012/005152 filed on Jun. 28, 2012, which claims priority under 35 U.S.C. §119(e) to U.S. Provisional Application No. 61/501,789 filed on Jun. 28, 2011, and to U.S. Provisional Application No. 61/655,508 filed on Jun. 5, 2012, all of which are hereby expressly incorporated by reference into the present application.

TECHNICAL FIELD

The present invention relates to a wireless communication system and, more particularly, to a method and apparatus for transmitting and receiving a signal between a user equipment and a base station in a wireless communication system.

BACKGROUND ART

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and the like.

DISCLOSURE

Technical Problem

An object of the present invention devised to solve the problem lies in a method and apparatus for receiving a signal between a user equipment and a base station in a wireless communication system.

The technical problems solved by the present invention are not limited to the above technical problems and other technical problems which are not described herein will become apparent to those skilled in the art from the following description.

Technical Solution

The object of the present invention can be achieved by providing a method of receiving a signal at a user equipment in a wireless communication system operating in time division duplexing (TDD) including confirming a subframe reconfigured as a downlink subframe among a plurality of subframes configured according to a TDD uplink-downlink configuration and receiving a signal in the reconfigured subframe, wherein an index of a last orthogonal frequency division multiplexing (OFDM) symbol, in which the signal is capable of being received, within the reconfigured subframe is set according to a predetermined condition.

In another aspect of the present invention, provided herein is a user equipment configured to receive a signal in a wireless communication system operating in time division duplexing (TDD) including a radio frequency (RF) unit and a processor, wherein the processor is configured to confirm a subframe reconfigured as a downlink subframe among a plurality of subframes configured according to a TDD uplink-downlink configuration and to receive a signal in the reconfigured subframe, and wherein an index of a last orthogonal frequency division multiplexing (OFDM) symbol, in which the signal is capable of being received, within the reconfigured subframe is set according to a predetermined condition.

If the reconfigured subframe is configured to include a symbol for sounding reference signal (SRS) transmission, the index of the last OFDM symbol, in which the signal is capable of being received, may be set to an index located ahead of the index of the last symbol of the reconfigured subframe by an index corresponding to a size of the symbol for SRS transmission. In particular, the last OFDM symbol of the reconfigured subframe may be different from a last OFDM symbol in which a downlink signal is received.

If a next subframe of the reconfigured subframe is configured as an uplink subframe, the index of the last OFDM symbol, in which the signal is capable of being received, may be set to an index located ahead of the index of the last symbol of the reconfigured subframe by an index corresponding to transmission start timing set for transmission of the uplink subframe. If a next subframe of the reconfigured subframe is configured as a downlink subframe, the index of the last OFDM symbol, in which the signal is capable of being received, may be set to the index of the last OFDM symbol of the reconfigured subframe.

Advantageous Effects

According to the present invention, a user equipment can stably transmit and receive a signal to and from a base station in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied as wireless (or radio) technology such as GSM (Global System for Mobile communications)/GPRS (General Packet Radio Service)/EDGE (Enhanced Data Rates for GSM Evolution). OFDMA may be embodied as wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE.

For clarity, the following description focuses on 3GPP LTE and LTE-A. However, the technical spirit of the present invention is not limited thereto. It should be noted that specific terms used in the following description are proposed for the convenience of description and better understanding of the present invention, and the use of these specific terms may be changed to another format within the technical scope or spirit of the present invention.

In a wireless communication system, a user equipment (UE) receives information from a base station in downlink (DL) and transmits information to the base station in uplink (UL). The information transmitted and received between the base station and the user equipment includes data and a variety of control information and a physical channel varies according to type/usage of the transmitted and received information.

Figure 1:
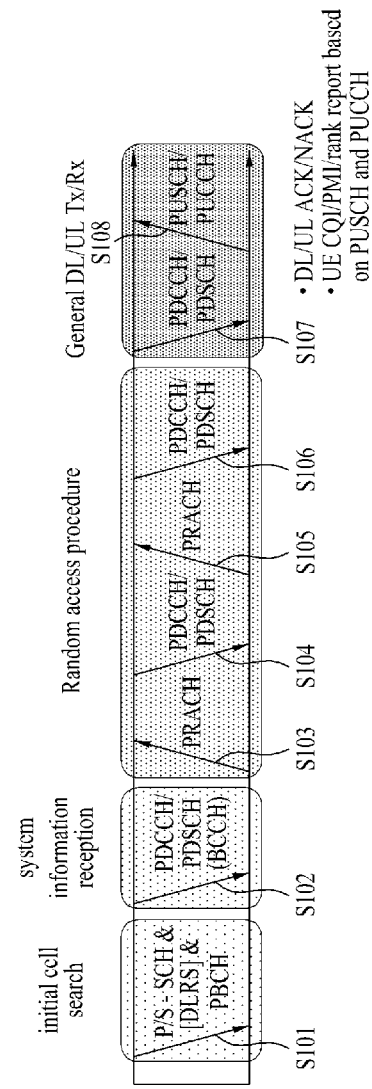
FIG. 1 is a view showing physical channels used for a $3^{rd}$ Generation Partnership Project (3GPP) Long Term Evolution (LTE) system and a general signal transmission method using the same.

FIG. 1 is a diagram showing physical channels used for a 3$^{rd}$ Generation Partnership Project (3GPP) Long Term Evolution (LTE) system and a general signal transmission method using the same.

When a UE is powered on or when the UE newly enters a cell, the UE performs an initial cell search operation such as synchronization with a BS in step S101. For the initial cell search operation, the UE may receive a Primary Synchronization Channel (P-SCH) and a Secondary Synchronization Channel (S-SCH) from the BS so as to perform synchronization with the BS, and acquire information such as a cell ID. Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which has completed initial cell search may receive a Physical Downlink Control Channel (PDCCH) and a Physical Downlink Shared Channel (PDSCH) corresponding to the PDCCH, and acquire more detailed system information in step S102.

Thereafter, the UE may perform a random access procedure in steps S103 to S106, in order to complete access to the BS. For the random access procedure, the UE may transmit a preamble via a Physical Random Access Channel (PRACH) (S103), and may receive a message in response to the preamble via the PDCCH and the PDSCH corresponding thereto (S104). In contention-based random access, a contention resolution procedure including the transmission of an additional PRACH (S105) and the reception of the PDCCH and the PDSCH corresponding thereto (S106) may be performed.

The UE which has performed the above-described procedure may then receive the PDCCH/PDSCH (S107) and transmit a Physical Uplink Shared Channel (PUSCH)/Physical Uplink Control Channel (PUCCH) (S108), as a general uplink/downlink signal transmission procedure. Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel state information (CSI), etc. In the present specification, HARQ ACK/NACK is briefly referred to as HARQ-ACK or ACK/NACK (A/N). HARQ-ACK includes at least one of positive ACK (briefly referred to as ACK), negative ACK (NACK), DTX and NACK/DTX. The CSI includes channel quality indicator (CQI), precoding matrix indicator (PMI), rank indicator (RI), etc. In general, although a UCI is periodically transmitted via a PUCCH, the UCI may be transmitted through a PUSCH if control information and traffic data are simultaneously transmitted. In addition, UCI may be aperiodically transmitted via a PUSCH according to a network request/instruction.

Figure 2:
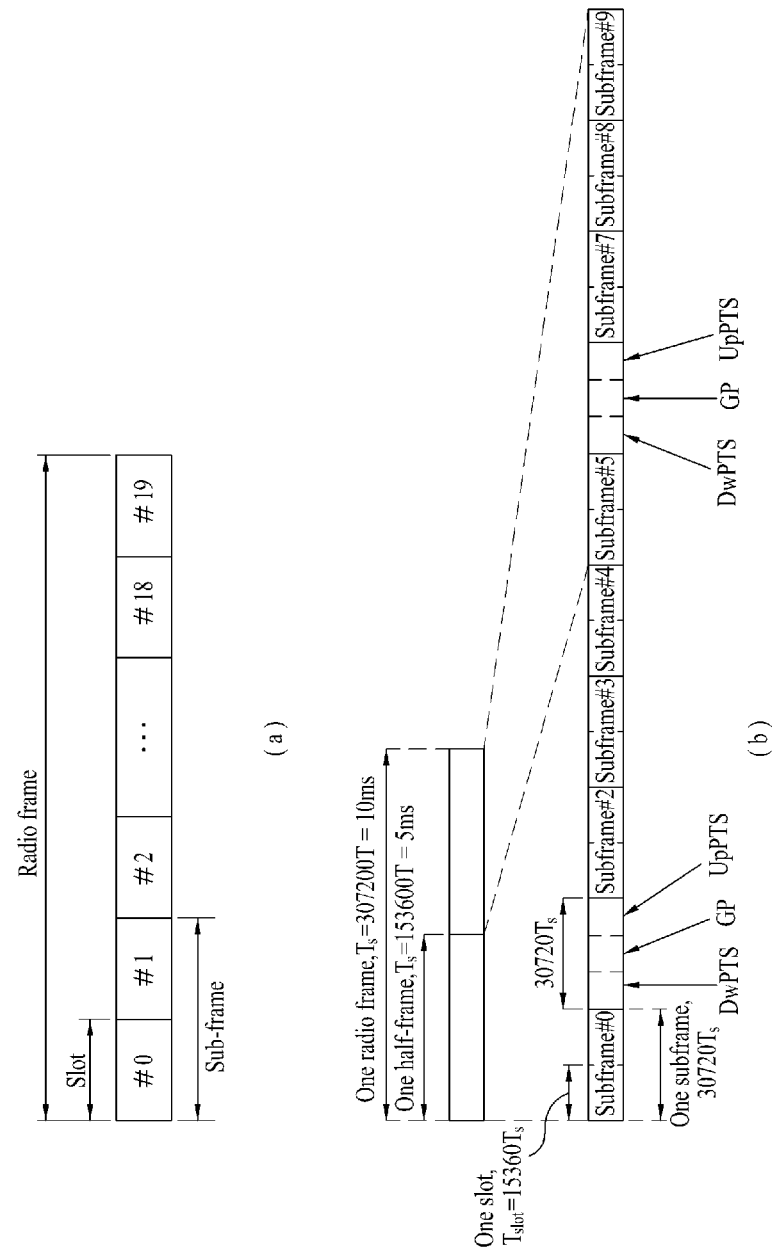
FIG. 2 is a diagram showing the structure of a radio frame.

FIG. 2 is a diagram showing the structure of a radio frame. In a cellular OFDM radio packet communication system, uplink/downlink data packet transmission is performed in subframe units and one subframe is defined as a predetermined time interval including a plurality of OFDM symbols. The 3GPP LTE standard supports radio frame structure type 1 applicable to frequency division duplexing (FDD) and radio frame structure type 2 applicable to time division duplexing (TDD).

FIG. 2($a$) shows the structure of radio frame structure type 1. A downlink radio frame includes 10 subframes and one subframe includes two slots in a time domain. A time required to transmit one subframe is referred to as a transmission time interval (TTI). For example, the length of one subframe may be 1 ms and the length of one slot may be 0.5 ms. One slot includes a plurality of OFDM symbols in a time domain and includes a plurality of resource blocks (RBs) in a frequency domain. In a 3GPP LTE system, since OFDM is used in downlink, an OFDM symbol indicates one symbol interval. The OFDM symbol may be referred to as an SC-FDMA symbol or symbol interval. A resource block (RB) as a resource allocation unit may include a plurality of consecutive subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the normal CP. In case of the extended CP, for example, the number of OFDM symbols included in one slot may be six. If a channel state is unstable, for example, if a user equipment (UE) moves at a high speed, the extended CP may be used in order to further reduce inter-symbol interference.

In case of using the normal CP, since one slot includes seven OFDM symbols, one subframe includes 14 OFDM symbols. At this time, the first at most three OFDM symbols of each subframe may be allocated to a Physical Downlink Control Channel (PDCCH) and the remaining OFDM symbols may be allocated to a Physical Downlink Shared Channel (PDSCH).

FIG. 2(b) is a diagram showing the structure of radio frame structure type 2. Radio frame structure type 2 includes two half frames. Each half frame includes four general subframes including two slots and special subframes including a downlink pilot time slot (DwPTS), a guard period (GP) and an uplink pilot time slot (UpPTS).

In the special subframes, the DwPTS is used for initial cell search, synchronization and channel estimation at a UE. The UpPTS is used for channel estimation at a BS and uplink transmission synchronization of a UE. That is, the DwPTS is used for downlink transmission and the UpPTS is used for uplink transmission. In particular, the UpPTS is used for PRACH preamble or SRS transmission. The guard period is used to eliminate interference occurring in uplink due to multi-path delay of a downlink signal between uplink and downlink.

In the current 3GPP standard for the special subframes, configurations shown in Table 1 below are defined. In Table 1, the DwPTS and the UpPTS are indicated in case of $T_s=1/(15000*2048)$ and the remaining region is configured as the guard period.

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of radio frame structure type 2, that is, the uplink/downlink (UL/DL) subframe configuration in the TDD system is shown in Table 2 below.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D denotes a downlink subframe, U denotes an uplink subframe, and S denotes a special subframe. In addition, Table 2 shows uplink-to-downlink switch-point periodicity in the UL/DL subframe configuration in each system.

The structure of the radio frame is only exemplary. Accordingly, the number of subframes included in the radio frame, the number of slots included in the subframe or the number of symbols included in the slot may be changed in various manners.

Figure 3:
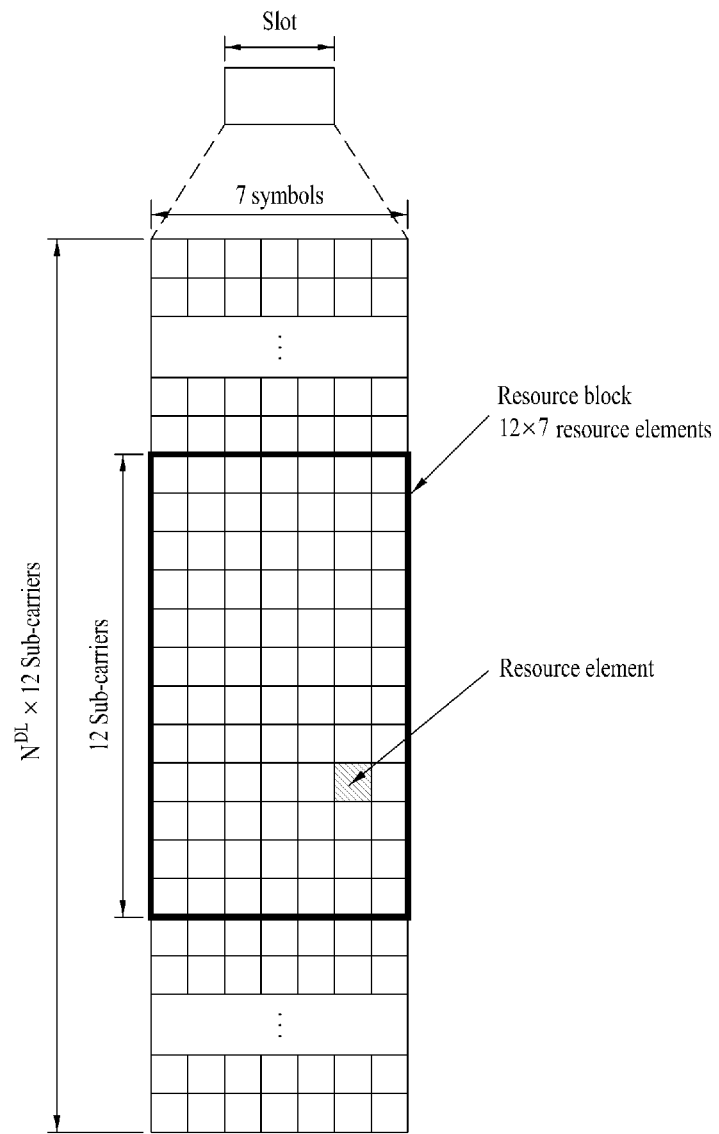
FIG. 3 is a diagram showing a resource grid of a downlink slot.

FIG. 3 is a diagram showing a resource grid of a downlink slot.

Referring to FIG. 3, a downlink slot includes a plurality of OFDM symbols in a time domain. One downlink slot may include seven (six) OFDM symbols and one RB may include 12 subcarriers in a frequency domain. Each element on the resource grid is referred to as a resource element (RE). One RB includes 12×7(6) REs. The number $N_{RB}$ of RBs included in a downlink slot depends on a downlink transmission bandwidth. The structure of the uplink slot may be equal to the structure of the downlink slot, except that an OFDM symbol is replaced with an SC-FDMA symbol.

Figure 4:
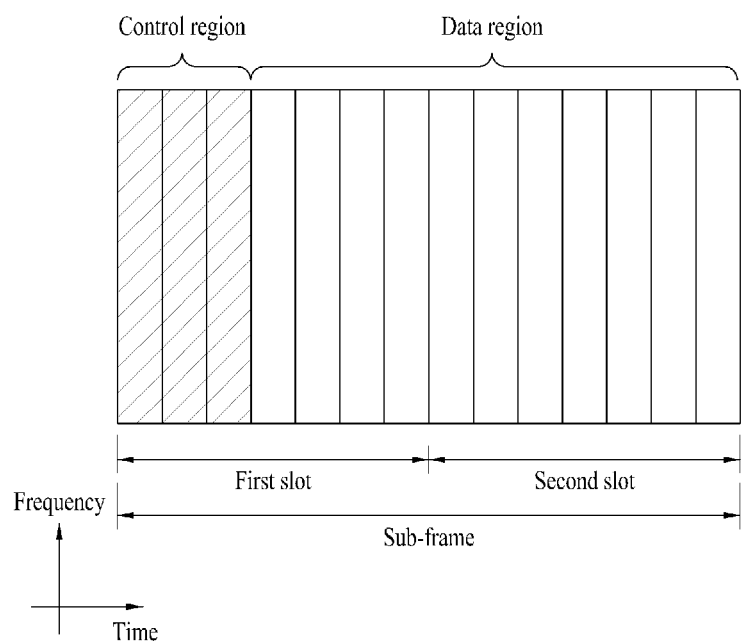
FIG. 4 is a diagram showing the structure of a downlink subframe.

FIG. 4 is a diagram showing the structure of a downlink subframe.

Referring to FIG. 4, a maximum of three (four) OFDM symbols of a front portion of a first slot of one subframe corresponds to a control region to which a control channel is allocated. The remaining OFDM symbols correspond to a data region to which a Physical Downlink Shared Channel (PDSCH) is allocated. Examples of the downlink control channels used in LTE include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and carries information about the number of OFDM symbols used to transmit the control channel within the subframe. The PHICH carries a HARQ ACK/NACK signal in response to uplink transmission.

The control information transmitted through the PDCCH is referred to as Downlink Control Information (DCI). The DCI includes resource allocation information and other control information of a UE or a UE group. For example, the DCI includes uplink or downlink scheduling information, an uplink transmit (Tx) power control command, etc.

The PDCCH may carry transmission format and resource allocation information of a Downlink Shared Channel (DL-SCH), transmission format and resource allocation information of an Uplink Shared Channel (UL-SCH), paging information on a Paging Channel (PCH), system information on the DL-SCH, resource allocation information of a higher layer control message such as a Random Access Response (RAR) transmitted on the PDSCH, a set of transmit (Tx) power control commands for individual UEs within a UE group, a Tx power control command, information indicating activation of Voice over IP (VoIP), etc. A plurality of PDCCHs may be transmitted in the control region. The UE may monitor the plurality of PDCCHs. The PDCCHs are transmitted on an aggregate of one or several consecutive control channel elements (CCEs). The CCE is a logical allocation unit used to provide the PDCCHs with a coding rate based on the state of a radio channel. The CCE corresponds to a plurality of resource element groups (REGs). The format of the PDCCH and the number of available bits are determined based on the number of CCEs. The BS determines a PDCCH format according to DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information RNTI (SI-RNTI) may be masked to the CRC. If the PDCCH is for random access response, a random access-RNTI (RA-RNTI) may be masked to the CRC.

Figure 5:
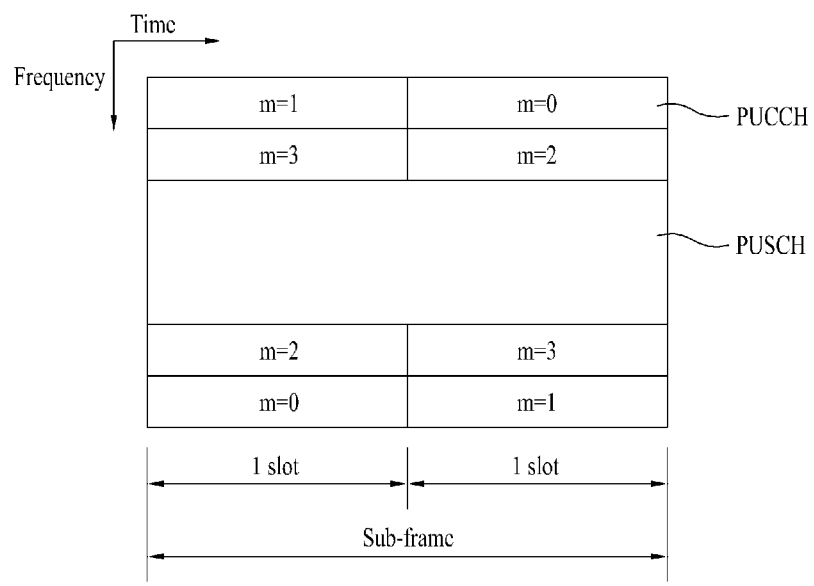
FIG. 5 is a diagram showing the structure of an uplink subframe.

FIG. 5 is a diagram showing the structure of an uplink subframe used in LTE.

Referring to FIG. 5, the uplink subframe includes a plurality (e.g., 2) of slots. The slot may include SC-FDMA symbols, the number of which is changed according to CP length. The uplink subframe may be divided into a control region and a data region in a frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH may be used to transmit the following control information.

Scheduling request (SR): Information used to request uplink (UL)-SCH resources. This is transmitted using an on-off keying (OOK) method.

HARQ ACK/NACK: Response signal to downlink data packets on a PDSCH. This indicates whether downlink data packets are successfully received. 1-bit ACK/NACK is transmitted in response to a single downlink codeword and 2-bit ACK/NACK is transmitted in response to two downlink codewords.

Channel state information (CSI): Feedback information for a downlink channel. The CSI includes channel quality indicator (CQI) and Multiple input multiple output (MIMO)-related feedback information includes rank indicator (RI), precoding matrix indicator (PMI), precoding type indicator (PTI), etc. 20 bits are used per subframe.

The amount of control information (UCI) transmittable by a UE in a subframe depends on the number of SC-FDMA symbols available in control information transmission. The SC-FDMA symbols available in control information transmission mean SC-FDMA symbols excluding SC-FDMA symbols for reference signal transmission in a subframe, and a last SC-FDMA symbol of the subframe is also excluded in case of a subframe in which a sounding reference signal (SRS) is set. A reference signal is used for coherent detection of a PUCCH.

The case of reconfiguring usage of a subframe according to an uplink-downlink traffic state in a TDD based LTE system will be described.

In a UL-DL configuration of a TDD radio frame, the structure of a subframe is semi-statically fixed. However, recently, in order to increase data transmission efficiency, a UL-DL configuration of a TDD radio frame is being attempted to be dynamically or semi-dynamically reconfigured according to uplink-downlink traffic state. For example, based on an existing UL-DL configuration, a downlink or uplink subframe is reconfigured/reinterpreted for uplink or downlink transmission, thereby improving system throughput.

More specifically, in a TDD based system beyond LTE, in order to adaptively improve system performance according to uplink traffic load which varies with time based on an initial UL-DL configuration (e.g. Table 2), a method of semi-statically or dynamically reconfiguring usage of a subframe (SF) (e.g., a method of switching an SF defined as U (or D) to D (or U) according to a UL-DL configuration) may be considered.

A method of managing a non-backward compatible CC in which subframe usage is not defined and semi-statically or dynamically configuring SF usage according to uplink/downlink traffic (e.g., a method of configuring a subframe (hereinafter, referred to as X), usage of which is not defined, as D or U) may be considered. In case of U=>D (or X=>D) reconfiguration (for convenience, assume that corresponding subframe timing is SF#K), a method of first signaling SF#K or DL grant to new UEs in advance and omitting scheduling for UL data transmission in a corresponding subframe with respect to legacy UEs to fake the legacy UEs such that DL data is transmitted to the new UEs through the corresponding subframe may be used.

If an uplink subframe is switched/configured to/as a downlink subframe, an available DL region in the subframe switched/configured to/as the downlink subframe may be restricted for some reasons. For example, one or more last symbols of the uplink subframe (or X subframe) to be switched/configured to/as the downlink subframe may be configured at cell-specific SRS transmission timing. In this case, a DL data size of a new UE scheduled to the corresponding subframe may be set differently from a normal subframe in order to suppress interference to/from SRS transmitted by other UEs. In addition, a switching time for UL=>DL switching may be required depending upon whether a next subframe of the corresponding uplink subframe to be switched/configured to/as the downlink subframe is an uplink subframe or a downlink subframe. Even in this case, a DL data size of a new UE scheduled to the corresponding subframe may be set differently from a normal subframe according to presence/absence of the switching time.

Hereinafter, in the present invention, a method of configuring a DL region in a subframe (hereinafter, referred to as recfg-d) switched/configured to/as a downlink subframe and a method of receiving a downlink signal will be described. Here, recfg-D may be a subframe already configured as an uplink subframe or a subframe which is not previously configured as an uplink or downlink subframe.

In the present specification, a future UE is differentiated from a legacy UE. In a wireless communication system operating in time division duplexing (TDD), signal transmission and reception is performed based on an uplink-downlink configuration for the legacy UE. However, a predetermined uplink-downlink configuration included in a subframe may be reconfigured/reinterpreted and a signal transmission and reception operation may be performed according to the reconfigured/reinterpreted uplink-downlink configuration. In the present specification, a future UE is briefly referred to as a UE unless stated otherwise.

First, a method of configuring a DL region if a subframe (that is, recfg-D) switched/configured to/as a downlink subframe is configured for cell-specific SRS transmission will be described in detail. For convenience, assume that, in recfg-D, the length of the DL region (this region may only DL data or all DL data and control channels (e.g., PCFICH, PDCCH, PHICH, etc.)) is M, the length of a GAP is G, and the length of an interval set as cell-specific SRS transmission timing is N. Accordingly, in recfg-D, G=1SF−(M+N) and M=1SF−(G+N) are given. Here, SF denotes the length of one subframe. Here, M may be predefined based on information about N (e.g., cell-specific SRS timing) and S (special subframe) configuration information or may be signaled from a base station via broadcast/L1/L2/RRC or DL grant PDCCH (scheduling recfg-D) (in a cell-specific or UE-specific manner).

In recfg-D, if M, G and N are given, the UE may perform (control channel and) DL data reception via the DL region during M symbols and transmit an SRS thereof (if present) or perform no action after N symbols from a time when timing advance (TA) thereof is applied when a GAP interval ends after completing data reception.

As another example, an interval other than the DL region in recfg-D may be defined as L. That is, L corresponds to an overall unavailable DL region. In this case, in recfg-D, M may be 1SF?L. Therefore, the UE may perform (control channel and) DL data reception via the DL region during M symbols. Here, L may be predefined based on information about N (e.g., cell-specific SRS timing) and S (special subframe) configuration information or may be signaled from a base station via broadcast/L1/L2/RRC or DL grant PDCCH (scheduling recfg-D) (in a cell-specific or UE-specific manner).

The proposed method is applicable to all recfg-Ds (including a corresponding symbol interval) configured as cell-specific SRS transmission timing or some recfg-Ds (instantaneously specified via a DL grant PDCCH (scheduling recfg-D) or semi-statically signaled via broadcast/L1/L2/RRC) in a recfg-D set.

Figure 6:
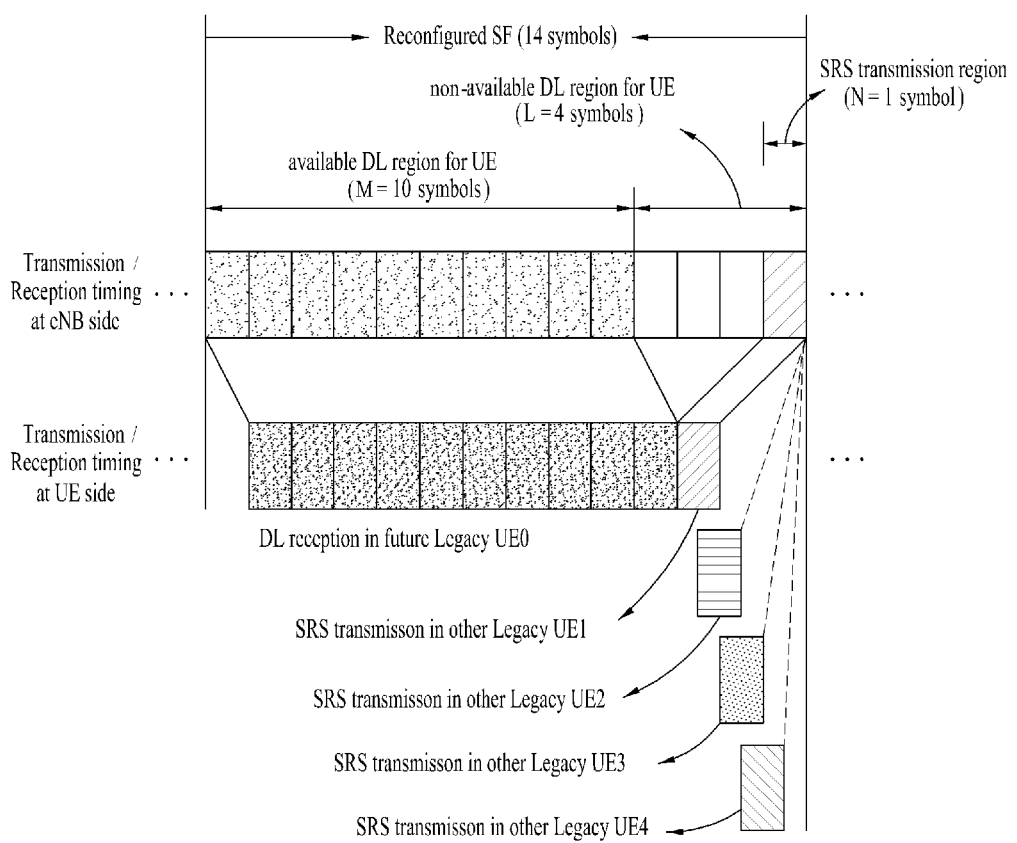
FIG. 6 is a diagram showing a subframe reconfiguration of a user equipment (UE) according to a first embodiment of the present invention.

FIG. 6 shows an example of the length of a DL region of a subframe reconfigured according to an embodiment of the present invention. In FIG. 6, assume that an overall subframe includes 14 symbols.

If it is assumed that the length of propagation delay of a UE scheduled in downlink is one symbol, the length of an SRS transmission interval is one symbol, the length of propagation delay of UEs for SRS transmission is one symbol in case of a UE, two symbols in case of a legacy UE1, one symbol in case of a legacy UE2, one symbol in case of a legacy UE3 and a half symbol in case of a legacy UE4, in recfg-D, the length M of the DL region may be 10 symbols. In addition, a recfg-D region (14−1−2−1=10 symbols) obtained by subtracting propagation delay (e.g., one symbol) of a UE scheduled in downlink, an SRS transmission interval (e.g., one symbol) and maximum propagation delay (e.g., two symbols) of UEs for SRS transmission from the length of one subframe may be configured as a maximum DL transmission region.

The UE may receive a downlink signal (e.g., a PDSCH signal or PHICH/PDCCH signal) in the DL region having a length of M. In addition, after the DL region, transmission timing according to propagation delay between uplink and downlink is applied (e.g., the end point of a G interval) such that uplink transmission (e.g., SRS) is performed or no action is performed (N interval). In the N interval, TA of the UE may be applied upon uplink transmission.

For example, the UE may decide the length of the DL region in a subframe reconfigured as a downlink subframe to M and receive a downlink signal until an interval indicated by an index of an OFDM symbol corresponding to the length M in the subframe. For example, referring to FIG. 6, since M corresponds to 10 symbols, the downlink signal may be received during the interval corresponding to the OFDM symbol index #10 of the reconfigured subframe (assume that the OFDM symbol index of the reconfigured subframe is #1).

As another example, if the length L of the interval which is not reconfigured for downlink transmission is signaled via RRC signaling, M is obtained by subtracting L from the length of one subframe (for example, in FIG. 6, if L corresponds to 4 symbols, M is 14−4=10 symbols) and the downlink signal may be received until the interval indicated by the index of the OFDM symbol corresponding to the length M in the reconfigured subframe.

In case of recfg-D which is not configured as cell-specific SRS transmission timing and/or recfg-D which does not accompany a protection operation for an SRS transmitted from other UEs and/or SRS transmission of a UE scheduled to recfg-D (at SRS transmission timing), the proposed method (N=0) may be extended. In this case, the interval M (or the interval L excluding the DL transmission region in recfg-D) occupied by the DL transmission region in recfg-D may be decided depending upon whether (an initial configuration of) a subframe located next to recfg-D is an uplink or downlink subframe.

Hereinafter, a method of configuring a DL region in recfg-D depending upon whether (an initial configuration of) a subframe located next to recfg-D is an uplink or downlink subframe will be described.

More specifically, if a subframe located next to recfg-D is an uplink subframe, M may be set in consideration of transmission start timing of UE(s) for transmitting a UL channel/signal via the uplink subframe similarly to the above-described method considering SRS transmission timing. Accordingly, if an uplink subframe is located next to recfg-D, the length (that is, M value) of the DL region of recfg-D is set to a value less than the length (e.g., 14 symbols) of one subframe. In contrast, if a subframe located next to recfg-D is a downlink subframe, since a next operation of recfg-D is DL (instead of UL), the length (that is, M value) of the DL transmission region may be set to the same value as the length (e.g., 14 symbols) of one subframe. In addition, in this case, the M value may not be separately signaled/indicated.

Figure 7:
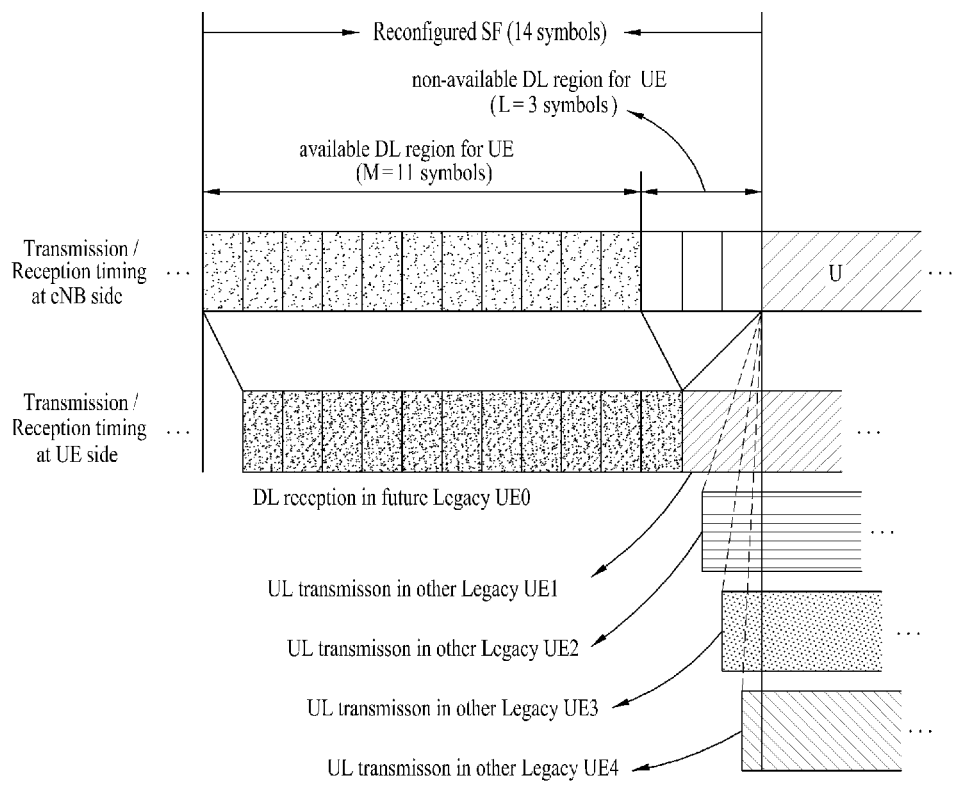
FIG. 7 is a diagram showing a reception interval of a reconfigured subframe of a UE if a next frame of a subframe is an uplink frame according to a second embodiment of the present invention.

FIG. 7 shows an example of configuring a DL region in recfg-D according to an embodiment of the present invention. In this example, an uplink subframe is located next to recfg-D. In FIG. 7, the length of one subframe corresponds to 14 symbols and the length of an interval corresponding to propagation delay for SRS transmission corresponds to one symbol in case of a UE, two symbols in case of a legacy UE1, one symbol in case of a legacy UE2, one symbol in case of a legacy UE3 and a half symbol in case of a legacy UE4.

Referring to FIG. 7, if a subframe located next to recfg-D is an uplink subframe, the length of an interval corresponding to transmission start timing of the next subframe corresponds to three symbols, the length (that is, M value) of the DL transmission region in recfg-D may correspond to 11 symbols (14−1−2=11) (that is, L=3). Accordingly, the UE may receive a downlink signal (e.g., a PDSCH signal or a PHICH/PDCCH signal) within the DL region (e.g., OFDM symbols #0 to 10) of recfg-D.

Figure 8:
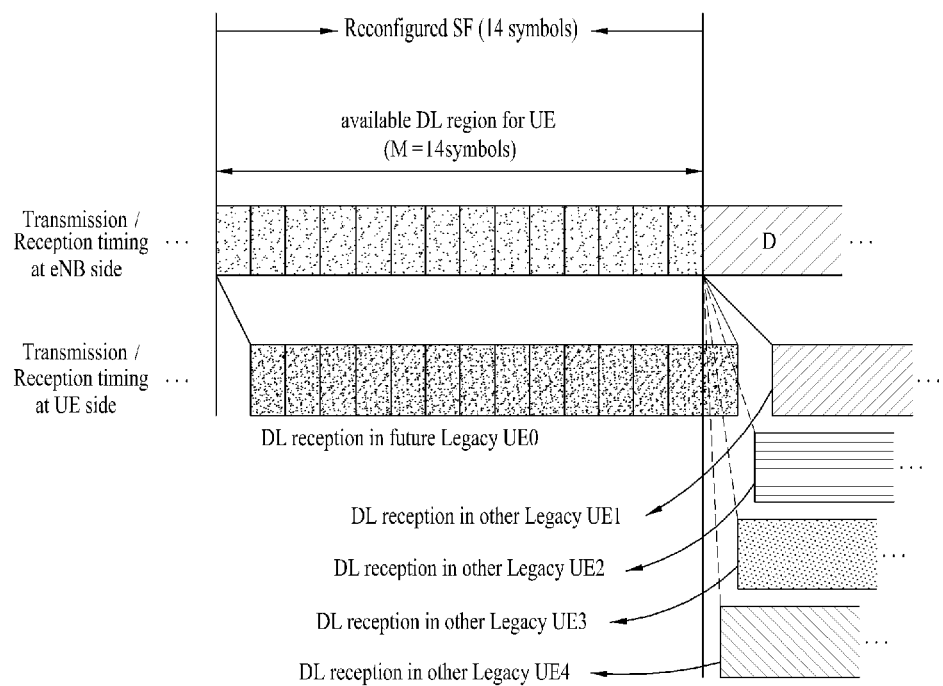
FIG. 8 is a diagram showing a reception interval of a reconfigured subframe of a UE if a next frame of a subframe is a downlink frame according to a second embodiment of the present invention.

FIG. 8 shows another example of configuring a DL region in recfg-D according to an embodiment of the present invention. In this example, a downlink subframe is located next to recfg-D. In FIG. 8, the length of one subframe corresponds to 14 symbols. Since a GAP for uplink signal transmission does not need to be considered, the length (that is, M value) of the DL transmission region in recfg-D may correspond to the length of one subframe, e.g., 14 symbols (that is, L=0). Accordingly, the UE may receive a downlink signal (e.g., a PDSCH signal or a PHICH/PDCCH signal) within the DL region (e.g., OFDM symbols #0 to 13) of recfg-D.

The above-described invention is generalized as follows. M for DL transmission in recfg-D may be respectively set to M1, M2 and M3 (M1≤M2≤M3) in the case in which recfg-D includes (specified) SRS transmission timing/symbols (case 1), in the case in which recfg-D is not (specified) SRS transmission timing but a subframe located next to recfg-D is U (case 2) and in the case in which recfg-D is not (specified) SRS transmission timing but a subframe located next to recfg-D is D (case 3). In this case, (for example, if it is assumed that N=1 in the case 1) M2=M1+1 (in this case, only one of M1 and M2 may be signaled/indicated) and/or M3=1 may be configured/determined.

In the present invention, recfg-D may be configured using various methods. For example, a recfg-D set may be signaled via high layer signaling (e.g., RRC signaling). In addition, recfg-D may be signaled using L1/L2 signaling (e.g., PDCCH signal). In the latter case, since a PDCCH cannot be received in a subframe until an uplink subframe is switched/configured to/as a downlink subframe, the PDCCH signal should be received in a downlink subframe before the subframe to be switched/configured to/as the downlink subframe. In this case, the PDCCH signal indicating switching/configuration to/as the downlink subframe may be restricted to be received in a recent downlink subframe before the reconfigured subframe. In addition, in order to indicate switching/configuration to/as the downlink subframe, the PDCCH signal may further include information indicating whether the subframe is reconfigured. In addition, the reconfiguration of the subframe may be indicated using a DL grant PDCCH signal.

The present invention is applicable to not only operation in a single cell based on TDD but also 1) the case in which a half-duplex UE, which does not support simultaneous transmission and reception operation (or does not perform simultaneous transmission and reception operation), operates in a single cell based on FDD composed of a pair of a DL carrier and a UL carrier or 2) the case in which a plurality of cells having different TDD DL-UL subframe configurations operates.

More specifically, the present invention is applicable to the case 1) on the assumption that a UE carrier in the same subframe is configured as recfg-D and a DL reception operation in recfg-D is performed in a DL carrier and is applicable to the case 2) on the assumption that a UL subframe of a first cell in the same subframe is configured as recfg-D and a DL reception operation in recfg-D is performed in a DL subframe of a second cell.

Figure 9:
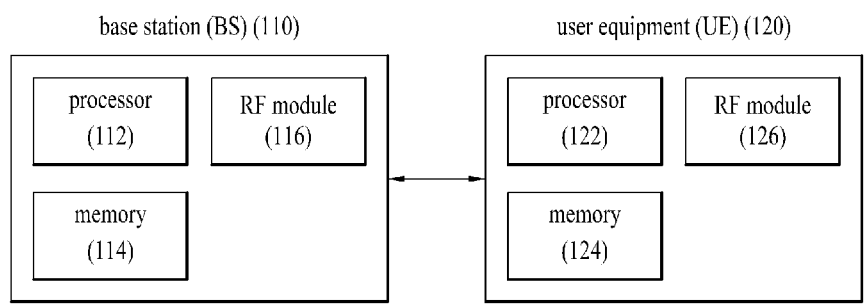
FIG. 9 is a diagram showing a base station and a UE to which the embodiment of the present invention is applicable.

FIG. 9 is a diagram showing a base station and a UE to which the embodiment of the present invention is applicable. If a wireless communication system includes a relay, communication in a backhaul link is performed between the BS and the relay and communication in an access link is performed between the relay and the UE. Accordingly, the BS and UE shown in FIG. 9 may be replaced with the relay according to situation.

Referring to FIG. 9, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although an example of applying a method and apparatus for transmitting and receiving a signal between a user equipment and a base station in a wireless communication system to a 3GPP LTE system has been described, the present invention is applicable to various radio access systems in addition to the 3GPP LTE system.

The invention claimed is:

1. A method of receiving a signal at a user equipment in a wireless communication system operating in time division duplexing (TDD), the method comprising:
    reconfiguring, by the user equipment, a specific subframe as a downlink subframe;
    wherein the specific subframe is configured as an uplink subframe based on a TDD uplink-downlink configuration, and
    wherein, if the specific subframe is configured to include a symbol for sounding reference signal (SRS) transmission, the index of a last orthogonal frequency division multiplexing (OFDM) symbol, in which the signal is capable of being received, is reconfigured to an index located ahead of the index of the last symbol of the reconfigured specific subframe according to a size of symbols for the SRS transmission; and
    receiving, by the user equipment, a downlink signal via the reconfigured specific subframe.

2. The method according to claim 1, wherein the last OFDM symbol of the reconfigured specific subframe is different from a last OFDM symbol in which a downlink signal is received.

3. The method according to claim 1, wherein, if a next subframe of the reconfigured specific subframe is configured as an uplink subframe, the index of the last OFDM symbol, in which the signal is capable of being received, is reconfigured to an index located ahead of the index of the last symbol of the reconfigured specific subframe according to a transmission start timing set for transmission of the uplink subframe.

4. The method according to claim 1, wherein, if a next subframe of the reconfigured specific subframe is configured as a downlink subframe, the index of the last OFDM symbol, in which the signal is capable of being received, is reconfigured to the index of the last OFDM symbol of the reconfigured specific subframe.

5. A user equipment configured to receive a signal in a wireless communication system operating in time division duplexing (TDD), the user equipment comprising:
    a radio frequency (RF) unit; and
    a processor,
    wherein the processor is configured to:
    reconfigure a specific subframe as a downlink subframe,
    wherein the specific subframe is configured as an uplink subframe based on a TDD uplink-downlink configuration, and
    receive a downlink signal via the reconfigured specific subframe,
    wherein, if the specific subframe is configured to include a symbol for sounding reference signal (SRS) transmission, the index of a last orthogonal frequency division multiplexing (OFDM) symbol, in which the signal is capable of being received, is reconfigured to an index located ahead of the index of the last symbol of the reconfigured specific subframe according to a size of symbols for the SRS transmission.

6. The user equipment according to claim 5, wherein the last OFDM symbol of the reconfigured specific subframe is different from a last OFDM symbol in which a downlink signal is received.

7. The user equipment according to claim 5, wherein, if a next subframe of the reconfigured specific subframe is configured as an uplink subframe, the index of the last OFDM symbol, in which the signal is capable of being received, is reconfigured to an index located ahead of the index of the last symbol of the reconfigured specific subframe according to a transmission start timing set for transmission of the uplink subframe.

8. The user equipment according to claim 5, wherein, if a next subframe of the reconfigured specific subframe is configured as a downlink subframe, the index of the last OFDM symbol, in which the signal is capable of being received, is reconfigured to the index of the last OFDM symbol of the reconfigured specific subframe.

* * * * *